United States Patent [19]
Carter et al.

[11] 3,722,213
[45] Mar. 27, 1973

[54] GEAR TRAIN FOR GAS TURBINE ENGINES

[75] Inventors: Carl W. Carter, Peoria; Lloyd E. Johnson, East Peoria, both of Ill.

[73] Assignee: Caterpillar Tractor Co., Peoria, Ill.

[22] Filed: Jan. 25, 1971

[21] Appl. No.: 109,393

[52] U.S. Cl. ............................................. 60/39.16 R
[51] Int. Cl. ............................ F02c 3/10, F02c 7/02
[58] Field of Search ..... 60/39.16 R; 74/331, 661, 718

[56] References Cited

UNITED STATES PATENTS

| | | | |
|---|---|---|---|
| 2,403,378 | 7/1946 | Kilpela | 192/48.6 X |
| 3,237,404 | 3/1966 | Flanigan et al. | 60/39.16 R |
| 3,481,145 | 12/1969 | Oldfield | 60/39.16 R |
| 3,498,057 | 3/1970 | Kronogard et al. | 60/39.16 R |
| 3,507,113 | 4/1970 | Herrmann et al. | 60/39.16 R |
| 3,546,879 | 12/1970 | Hass | 60/39.16 R |
| 3,626,692 | 12/1971 | Kamm | 60/39.16 R |

*Primary Examiner*—Charles J. Myhre
*Assistant Examiner*—Thomas C. Perry
*Attorney*—Charles M. Fryer et al.

[57] ABSTRACT

A triple lay shaft gear train for a two-shaft gas turbine engine. The gear train includes a lay shaft mounted overrunning clutch which permits a uni-directional lock-up of the power turbine and gasifier turbine when synchronous speeds have been reached and a positive lock-up coupling means which permits selective bi-directional lock-up of the lay shafts to provide the advantages of both single-shaft and two-shaft turbine operation. The gasifier turbine and power turbine are capable of different rotational speeds.

1 Claim, 3 Drawing Figures

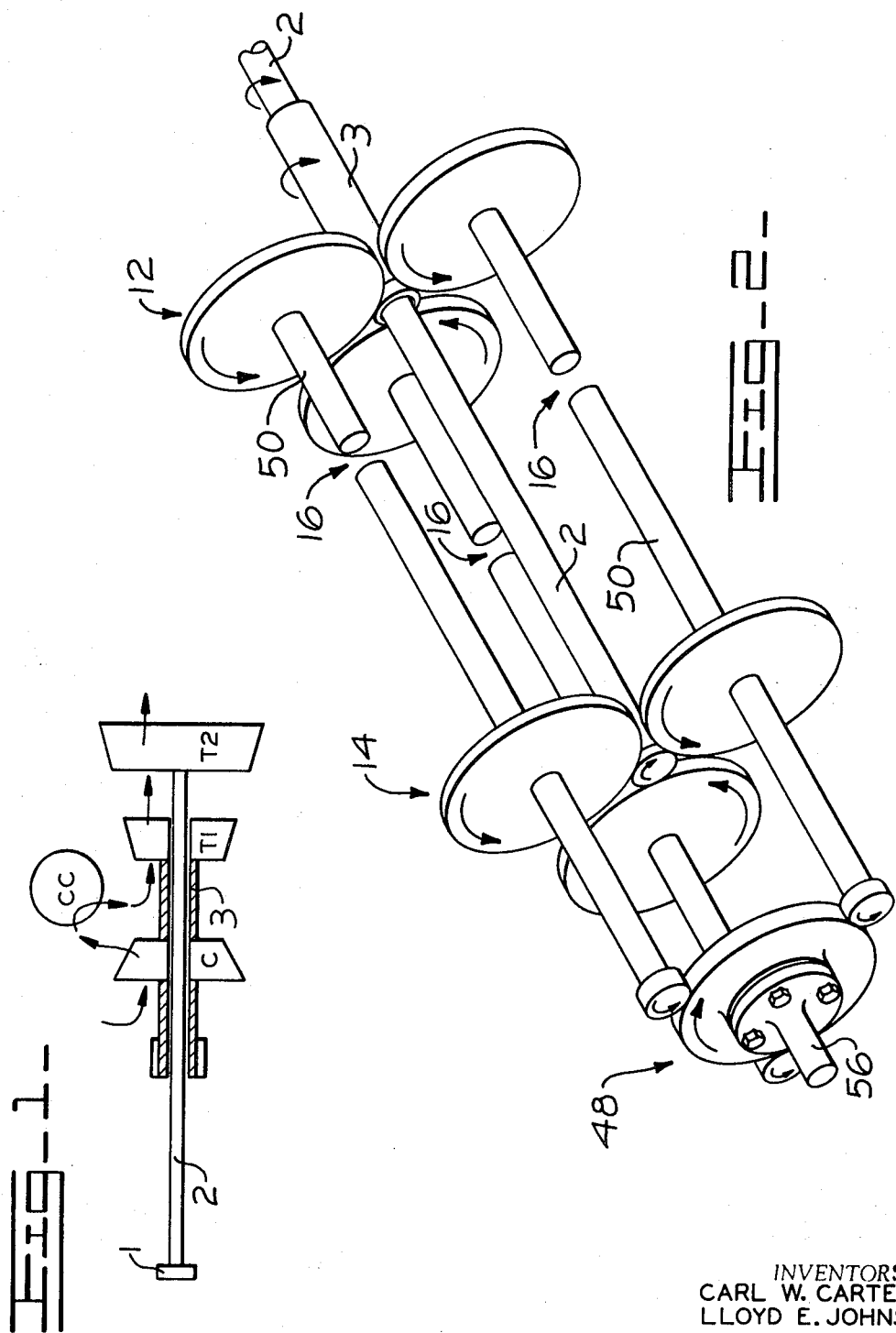

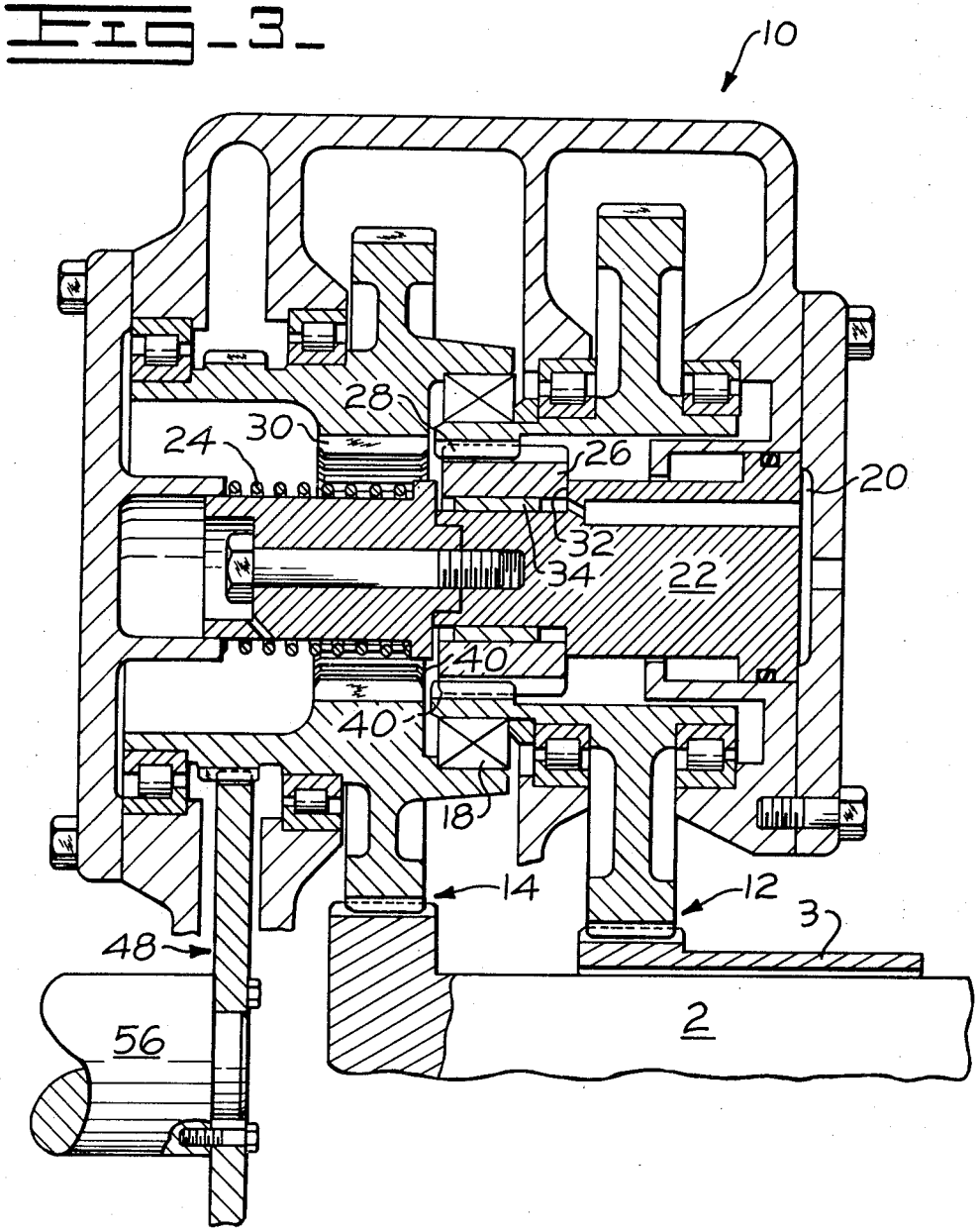

GEAR TRAIN FOR GAS TURBINE ENGINES

BACKGROUND OF THE INVENTION

This invention relates to a new and improved gas turbine engine. More particularly, the invention is directed to a gearing arrangement for a two-shaft gas turbine engine which allows enjoyment of the advantages of both two-shaft and single-shaft operation.

Single-shaft gas turbine engines are desirable in applications requiring relatively constant operating speeds. However, in these applications the single-shaft arrangement has the disadvantage of requiring a very high starting torque since the starting device utilized has to turn the driven load and accessories in addition to the gasifier turbine components. Very large starter units are required with consequent losses in efficiency, economy, and usable space.

One attempt to solve this problem has been the utilization of a two-shaft gas turbine engine which has separately mounted gasifier turbine and power turbine units. With this type of system, the starting torque requirement is substantially reduced because the starting unit is required to turn only the gasifier turbine upon start-up. A one-way or overrunning clutch is generally provided in this arrangement to operatively connect the load driving turbine to the gasifier turbine for unitary rotation when normal operating speed is reached. Such a system is shown by U.S. Pat. No. 2,591,540 to Grylls. However, in situations where dynamic braking of the driven load is required, the overrunning clutch is inadequate. A positive lock-up of the gasifier and power turbines, equivalent to a single-shaft operation, is required.

Another important consideration in two-shaft gas turbine engines is space utilization. It is extremely desirable in most installations to provide gear trains with small radial and axial dimensions.

This invention is principally directed to a coupling means for connecting a gasifier turbine to a power turbine in a two-shaft gas turbine engine which has very small dimensions both axially and radially.

One object of this invention is to provide a gear train for coupling the turbines in a two-shaft gas turbine engine which produces low loads on individual gears and bearings.

Another object of this invention is to provide a coupling means which is selectively operable during turbine rotation and which provides a positive lock-up between the gasifier turbine shaft and the power turbine shaft.

Another object of this invention is to provide a shifting mechanism which allows a two-shaft gas turbine engine to be started in an unloaded condition and converted to a single-shaft operation when operating speeds are attained.

Yet another object of this invention is to provide a gas turbine engine gear train which distributes loading through a triple lay shaft system to reduce individual gear sizes and gain consequent savings in space.

Another object of this invention is to mount the coupling means for the gasifier turbine and the power turbine upon relatively low speed lay shafts to reduce critical balancing requirements.

Still another object of this invention is to provide a speed synchronizing overrunning clutch to couple the relatively low speed lay shafts of a two shaft gas turbine engine to avoid the high level centrifugal force and stress conditions associated with the high speed principal turbine shafts.

Other objects and advantages of the present invention will become apparent from the following descriptions and claims.

The accompanying drawing shows by way of illustration the preferred embodiments of the present invention and the principles thereof. It is recognized that other embodiments of the invention utilizing the same or equivalent principles may be used and the structural changes may be made as desired by those skilled in the art without departing from the present invention and the purview of the appended claims.

BRIEF DESCRIPTION OF THE DRAWING

FIG. 1 is a schematic illustration of a two-shaft gas turbine engine system utilizing the present invention;

FIG. 2 is a schematic isometric view of the gear train arrangement of the present invention;

FIG. 3 is a longitudinal sectional view of the gear train and coupling means of the present invention.

DETAILED DESCRIPTION OF THE INVENTION

FIG. 1 shows a schematic representation of a typical two-shaft gas turbine power plant which could embody the principles of the present invention. As shown in FIG. 1, a compressor C, which is driven by a gasifier turbine $T_1$, supplies compressed air to the combustion chamber CC in which fuel and air are burned to produce working fluid for both the turbine $T_1$ and the power turbine $T_2$ which drives a load 1 through the power turbine shaft 2. The gasifier turbine is drivingly connected to the compressor through the gasifier turbine shaft 3. The present invention is directed to means for selectively connecting the shafts 2 and 3.

FIG. 2 shows a schematic representation of the gear train transmission of the present invention. The gasifier turbine gear set is shown generally at 12 and a power turbine gear set is shown generally at 14. A reduction gear set, shown generally at 48, connects the power turbine gear set to the load output shaft 56. Three lay shafts 50 are provided for each of the gear sets 12 and 14. These lay shafts normally operate at speeds substantially less than the shafts 2 and 3. The coupling means of the present invention for each of the respective lay shaft sets, and consequently for gasifier and power turbine shafts, would be provided at each of the locations designated 16 in the drawing. By inserting the coupling means between the relatively low speed lay shaft as opposed to directly between the main shafts 2 and 3, less precise alignment and balance tolerances are required.

FIG. 3 shows a detailed view of the coupling and gear train components of the present arrangement. Indicated generally at 10 is one of the three lay shaft and coupling units which are positioned in the locations 16 as shown in FIG. 2. As can be seen in the drawing, the gasifier turbine shaft 3 is in constant engagement with the gasifier turbine gear set 12. Similarly, the power turbine shaft 2 constantly engages the power turbine gear set 14. The gear ratio in the sets 12 and 14 may be different to allow the power turbine shaft and the gasifier turbine shaft to operate at different speeds. Generally the overall efficiency of the power plant can be improved substantially if the gasifier turbine is designed to operate at higher rotational speed than the power turbine. An overrunning or sprag clutch 18 is disposed between the gear sets 14 and 12. This clutch will permit torque transmission in only one direction. It will jam and provide a positive connection between its driving and driven elements whenever the power turbine gear set 14 attempts to assume a speed greater than that of the gasifier turbine gear set 12. The overrunning clutch will not be described in detail herein as it is one of several such devices manufactured for the purpose of uni-directional torque transmission.

Coupling means comprising a coupling collar 26 and a piston means 22 are also shown. These means provide a positive lock-up between the two gear sets when desired. As more fully described hereinafter, the coupling means operates to positively lock-up the respective gear sets when engaged to provide what is equivalent to single-shaft engine operation.

When the gas turbine engine is to be started, a conventional starting system (not shown) directly communicates with and turns the gasifier turbine gear set 12 in the convention manner. At start-up, the coupling means 26 is in the disengaged position shown in FIG. 3 and the overrunning clutch 18 is unjammed so that the gasifier turbine gear set and the power turbine gear set are in the uncoupled state. As the gasifier gear set is brought up to operating speed, the power turbine gear set begins to rotate by virtue of the impingement of working fluid upon the power turbine blades in the known manner. Then the gasifier gear set reaches approximately 65 percent of its rated speed, and if external work output has yet to be demanded of the engine, the power turbine gear set will accelerate, reach gasifier gear set speed and then attempt to surpass it. At this point, the overrunning clutch 18 jams and causes the power turbine to drive the gasifier turbine. The automatic operation just described with reference to one of the coupling units 10 occurs simultaneously in all three of said coupling units.

In order to provide a selectively operative, positive lock-up in either direction of shaft rotation, the coupling collar means 26 is provided to interengage a spline 30 on the power turbine gear set and the spline 28 on the gasifier turbine gear set. When this interengagement is desired, oil under pressure is directed into a chamber 20 to force a piston 22 leftwardly as shown in FIG. 3 against the biasing force of a compression spring 24. The piston 22 carries the coupling collar 26 in a groove 32 which is provided with bearing means 34 which allow free rotation of the coupling collar within said groove. The coupling collar is rotatably disposed within the internal spline 28 of the gasifier gear set, as shown. When the piston 22 moves leftwardly, the coupling collar spline and the power turbine gear set spline 30 come into contact. The side faces of both the coupling collar spline and the power turbine gear set spline are beveled as shown at 40 in the drawing in such a manner as to cause a slight rotation of the power turbine gear set in a direction which unlocks the overrunning clutch 18. This slight relative angular movement permits alignment of said splines and subsequent engagement thereof. While there would necessarily be a coupling collar 26 for each of the three lay shaft set assemblies, only one overrunning clutch 18 would be necessary to lock the gear sets in synchronous speed. In practice, one of the three couplings would engage prior to the other two couplings to provide a sequential lock-up of the two gear set systems.

Disengagement of the coupling means would occur whenever the oil pressure in chamber 20 was released. The ingress and egress of oil to the chamber 20 can be controlled either manually or in response to any of the well-known engine parameters such as speed, temperature or pressure in the well-known manner. It should also be noted that either a single annular actuator piston for all three of the coupling collars 26 could be used or a separate actuator for each coupling collar could be utilized.

It should be noted that although the novel coupling means of the present invention has been described here in relation to an engine having a triple lay shaft transmission, it is apparent that said coupling means has utility in single lay shaft arrangements.

While the preferred embodiments of the invention have been illustrated and described, it is to be understood that these embodiments are capable of variation and modification and are not limited to the precise details set forth, but rather include such variations and modifications as fall within the scope of the appended claims.

What is claimed is:

1. In a two-shaft gas turbine engine having a gasifier turbine mounted for rotation upon a first shaft means and a power turbine mounted for rotation upon a second shaft means and having three lay shaft means for each of said first and second shaft means; first means associated with each of said lay shaft means for selectively coupling said first shaft means and said second shaft means in a positive, bidirectional lock-up during rotation of said first and second shaft means, said first means including gear means operatively associated with each of said first and second shaft means and a selectively actuated coupling collar means having spline means which directly coact with spline means on said gear means, pressure-actuated piston means for positively moving said coupling collar spline means into engagement with said spline means on said gear means, and second means including an overrunning clutch for coupling said first shaft means and said second shaft means in response to the achievement of synchronous speed between said first and second shaft means.

* * * * *